(12) United States Patent
Li et al.

(10) Patent No.: US 12,375,355 B2
(45) Date of Patent: Jul. 29, 2025

(54) INTENT MAINTENANCE METHOD AND APPARATUS

(71) Applicant: HUAWEI TECHNOLOGIES CO., LTD., Guangdong (CN)

(72) Inventors: Yexing Li, Shanghai (CN); Xianming Li, Shanghai (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/320,104

(22) Filed: May 18, 2023

(65) Prior Publication Data

US 2023/0291651 A1 Sep. 14, 2023

Related U.S. Application Data

(63) Continuation of application No. PCT/CN2021/125201, filed on Oct. 21, 2021.

(30) Foreign Application Priority Data

Nov. 18, 2020 (CN) .......................... 202011295591.1

(51) Int. Cl.
 *H04L 41/0894* (2022.01)
 *G06N 5/02* (2023.01)
(52) U.S. Cl.
 CPC .......... *H04L 41/0894* (2022.05); *G06N 5/02* (2013.01)

(58) Field of Classification Search
 CPC ............ H04L 41/0894; H04L 41/0816; H04L 41/145; H04L 41/16; G06N 5/02; G06N 5/022; G06F 16/9535; G06F 9/546; G06F 16/958
 See application file for complete search history.

(56) References Cited

U.S. PATENT DOCUMENTS

| 10,075,450 | B2 * | 9/2018 | Bush | H04L 63/0838 |
| 11,727,068 | B2 * | 8/2023 | Barbedor | G06F 16/95 |
| | | | | 715/764 |
| 2012/0224569 | A1 * | 9/2012 | Kubota | H04W 84/20 |
| | | | | 370/338 |
| 2015/0135085 | A1 * | 5/2015 | Shoham | G06Q 10/1095 |
| | | | | 715/739 |
| 2019/0317994 | A1 * | 10/2019 | Singh | G06F 40/30 |

FOREIGN PATENT DOCUMENTS

CN 111858890 A 10/2020

* cited by examiner

*Primary Examiner* — Abdullahi E Salad

(57) ABSTRACT

An intent maintenance method and an apparatus provides a status awareness module that obtains a first duration corresponding to an intent. The status awareness module receives from a policy management module first information indicating that a first executable command corresponding to the intent starts to be executed. The status awareness module determines second duration when execution duration of the first executable command reaches the first duration and an object of the intent is not achieved, the second duration being greater than the first duration, and sends second information to the policy management module.

10 Claims, 11 Drawing Sheets

INTENT MAINTENANCE METHOD AND APPARATUS

CROSS-REFERENCE TO RELATED APPLICATIONS

This application is a continuation of International Patent Application No. PCT/CN2021/125201 filed on Oct. 21, 2021 which claims priority to Chinese Patent Application No. 202011295591.1 filed on Nov. 18, 2020. The disclosures of the aforementioned applications are hereby incorporated by reference in their entireties.

TECHNICAL FIELD

Embodiments of this disclosure relate to the field of network management, and in particular, to an intent maintenance method and an apparatus.

BACKGROUND

A working group of industry specification group experiential networked intelligence (ISG ENI) established by the European Telecommunications Standards Institute (ETSI) aims to define a cognitive network management system architecture that determines a behavior control model based on an observation direction. The architecture uses an artificial intelligence (AI) technology and a context-aware policy to adjust offered services based on changes in a user need, an environmental condition, and a service goal. The system is experiential in that the system learns related knowledge from instructions of an operator to improve actions of the system in the future. This helps a carrier automate a network configuration and a monitoring process of the carrier, thereby reducing an operating expense and improving use and maintenance of a network of the carrier. Currently, an intent-based experiential networked intelligence (EM) architecture is defined, as shown in FIG. 1.

An intent system periodically determines whether an intent is achieved from a time point at which the intent is implemented. If the intent cannot be achieved, the intent system adjusts an executable command corresponding to the intent. However, it takes some time from a beginning of execution to a time point at which the executable command of the intent takes effect. In this time period, a failure to achieve an object of the intent does not mean that the executable command is invalid. Therefore, there is no need to adjust the executable command, and it is meaningless to determine, within the time period, whether the object of the intent is achieved. Further, a frequent handover of the executable command of the intent is unfavorable to achievement of the object of the intent. This causes low efficiency in achieving the object of the intent and also causes consumption of system resources.

SUMMARY

Embodiments of this disclosure provide an intent maintenance method and an apparatus to resolve a problem that efficiency of achieving an object of an intent is low due to a ping-pong handover of an executable command.

According to a first aspect, an embodiment provides an intent maintenance method. The method includes the following.

A status awareness module obtains first duration corresponding to an intent and receives first information from a policy management module, where the first information indicates that a first executable command corresponding to the intent starts to be executed. The status awareness module determines second duration when execution duration of the first executable command reaches the first duration and an object of the intent is not achieved, where the second duration is greater than the first duration. The status awareness module sends second information to the policy management module, where the second information indicates the second duration.

According to the foregoing method, a ping-pong handover of an intent system on an executable command of the intent is reduced before an intent-driven object is achieved, thereby improving efficiency of the intent system in achieving the intent-driven object and reducing resource consumption.

In a possible design, the method further includes: The status awareness module determines third duration when the object of the intent is achieved before the first duration reached, and the execution duration of the first executable command is less than the first duration, where the third duration is less than the first duration; and the status awareness module sends third information to the policy management module, where the third information indicates the third duration.

According to the foregoing method, the ping-pong handover of the intent system on the executable command of the intent is reduced before the intent-driven object is achieved, thereby improving the efficiency of the intent system in achieving the intent-driven object and reducing the resource consumption.

In a possible design, the third duration is determined based on the execution duration of the first executable command.

In a possible design, when the status awareness module determines the second duration, the status awareness module sends fourth information to a knowledge management module, where the fourth information indicates that the execution duration of the first executable command reaches the first duration and the object of the intent is not achieved; and the status awareness module receives fifth information from the knowledge management module, where the fifth information indicates the second duration.

According to the foregoing method, the second duration may be determined by the knowledge management module.

In a possible design, when the status awareness module determines the third duration, the status awareness module sends sixth information to a knowledge management module, where the sixth information indicates the execution duration of the first executable command; and the status awareness module receives seventh information from the knowledge management module, where the seventh information indicates the third duration.

According to the foregoing method, the third duration may be determined by the knowledge management module.

In a possible design, the first duration is carried by eighth information, and the eighth information is for creating or implementing or modifying the intent; or the first duration is configured in an intent knowledge repository.

In a possible design, the first duration is determined based on duration required for achievement of an intent-driven object in a process of simulated intent implementation.

According to a second aspect, an embodiment provides an intent maintenance method. The method provides for a policy management module obtaining a first duration corresponding to an intent and sends the first information to a status awareness module, where the first information indicates that a first executable command corresponding to the intent starts to be executed. The policy management module adjusts the first executable command to a second executable command corresponding to the intent when execution duration of the first executable command reaches the first duration and an object of the intent is not achieved, and receives second information from the status awareness module, where the second information indicates second duration, and the second duration is greater than the first duration.

According to the foregoing method, a ping-pong handover of an intent system on an executable command of the intent is reduced before an intent-driven object is achieved, thereby improving efficiency of the intent system in achieving the intent-driven object and reducing resource consumption.

In a possible design, the method further includes: The policy management module receives third information from the status awareness module when the object of the intent is achieved before the first duration is reached, and the execution duration of the first executable command is less than the first duration, where the third information indicates third duration, and the third duration is less than the first duration.

According to the foregoing method, the ping-pong handover of the intent system on the executable command of the intent is reduced before the intent-driven object is achieved, thereby improving the efficiency of the intent system in achieving the intent-driven object and reducing the resource consumption.

In a possible design, the third duration is determined based on the execution duration of the first executable command.

In a possible design, the first duration is carried by eighth information, and the eighth information is for creating or implementing or modifying the intent; or the first duration is configured in an intent knowledge repository.

In a possible design, the first duration is determined based on duration required for achievement of an intent-driven object in a process of simulated intent implementation.

According to a third aspect, an embodiment provides an intent maintenance method. The method includes receipt by a knowledge management module of fourth information from a status awareness module, where the fourth information indicates that execution duration of a first executable command of an intent reaches first duration and an object of the intent is not achieved. The knowledge management module determines second duration, where the second duration is greater than the first duration and sends fifth information to the status awareness module, where the fifth information indicates the second duration.

According to the foregoing method, the second duration may be determined by the knowledge management module.

In a possible design, the method further includes: The knowledge management module updates, based on the second duration, a first duration average value corresponding to an intent whose type is the same as that of the intent.

According to the foregoing method, the first duration average value may be updated by the knowledge management module.

According to a fourth aspect, an embodiment provides an intent maintenance method. The method includes receipt by a knowledge management module of sixth information from a status awareness module, where the sixth information indicates execution duration of a first executable command when an object of an intent is achieved. The knowledge management module determines third duration based on the execution duration of the first executable command, where the third duration is less than the first duration and sends seventh information to the status awareness module, where the seventh information indicates the third duration.

According to the foregoing method, the third duration may be determined by the knowledge management module.

In a possible design, the method further includes: The knowledge management module updates, based on the third duration, a first duration average value corresponding to an intent whose type is the same as that of the intent.

According to the foregoing method, the first duration average value may be updated by the knowledge management module.

According to a fifth aspect, a computer-readable storage medium is provided that stores a computer program. When the computer program is run on a computer, the computer is enabled to perform the method according to the first aspect, the second aspect, the third aspect, or the fourth aspect.

According to a sixth aspect, a computer program product is provided that includes a program. When the computer program product runs on a computer, the computer is enabled to perform the method according to the first aspect, the second aspect, the third aspect, or the fourth aspect.

According to a seventh aspect, an apparatus, including a processor and a memory is provided. The memory is configured to store computer-executable instructions, and the processor is configured to execute the computer-executable instructions stored in the memory to enable the apparatus to perform the method according to the first aspect, the second aspect, the third aspect, or the fourth aspect.

According to an eighth aspect, an apparatus, including a processor and an interface circuit is provided. The interface circuit is configured to receive code instructions and transmit the code instructions to the processor, and the processor runs the code instructions to perform the method according to the first aspect, the second aspect, the third aspect, or the fourth aspect.

DESCRIPTION OF EMBODIMENTS

The following first briefly describes an EM architecture in embodiments of this disclosure.

Figure 1:
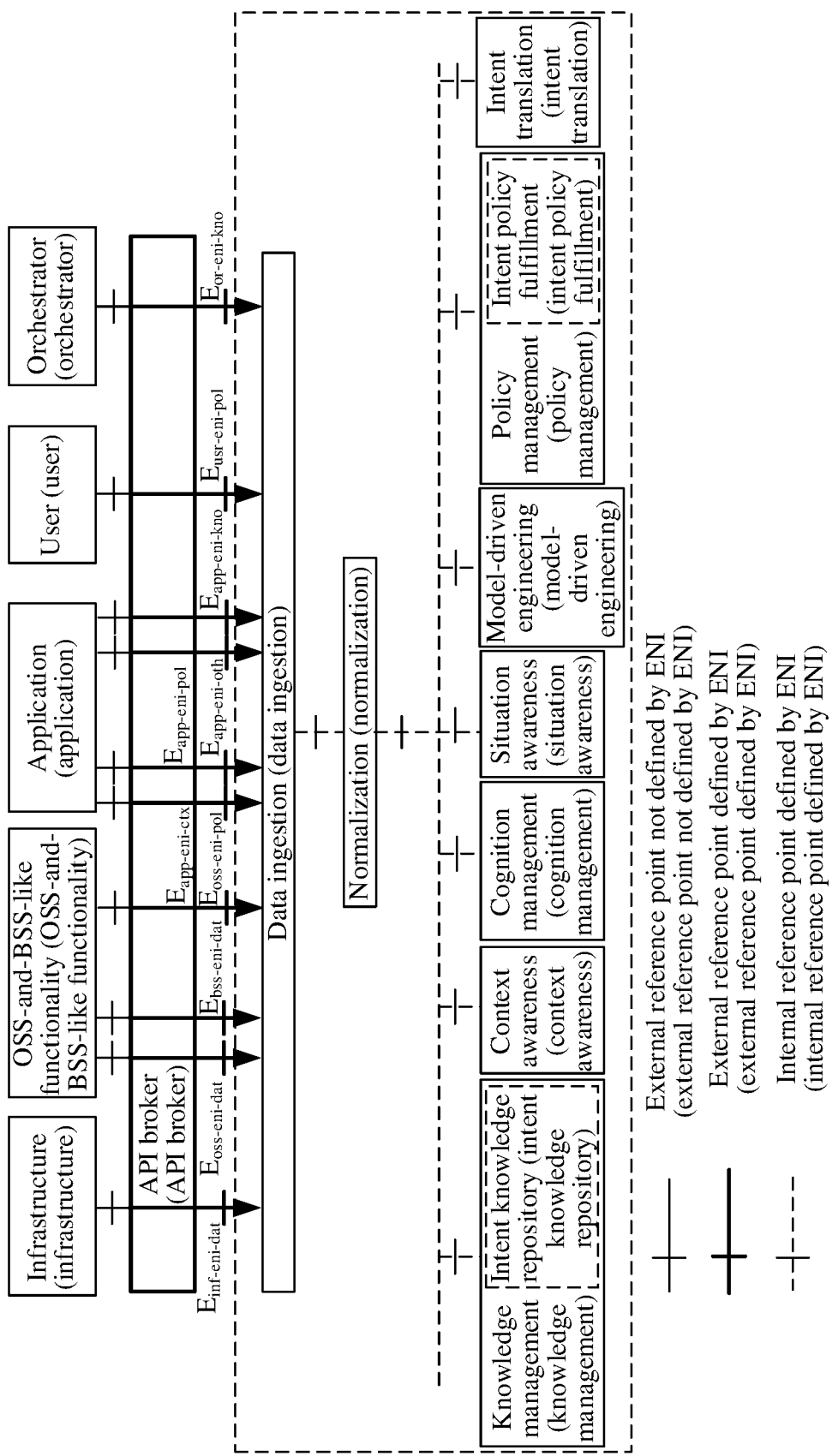
FIG. 1 is a schematic diagram of an ENI architecture to which an embodiment of this disclosure is applied.

The ENI architecture includes 10 functional modules, which are classified into four types: input functional modules, output functional modules, analysis functional modules, and decision-making functional modules, as shown in FIG. 1.

The input functional modules (namely, data ingestion and normalization modules) are responsible for operations such as receiving data from an external system and normalizing the data. A data ingestion module and a normalization module are two modules.

The output functional modules (namely, output generation and denormalization modules) are responsible for converting a command inside a system into a format that can be processed by an external system and sending the format to the external system.

The analysis functional modules are responsible for sensing and analyzing a current network status and predicting a future network status. The analysis functional modules include a knowledge management module, a context awareness module, and a cognition management module.

The knowledge management module is mainly responsible for managing all knowledge within an ENI scope, identifies a policy type of an intent, and stores knowledge related to the intent.

The context awareness module is mainly responsible for obtaining status and environment information of an assisted system. For example, the context awareness module is configured to obtain performance data of a network element (such as a base station (gNodeB)). The assisted system may be a radio access network element or a core network element (such as a user plane function (UPF)).

The cognition management module is mainly responsible for network data understanding and network status cognition in an intent maintenance process.

The decision-making functional modules are configured to, based on status awareness of a network, generate a new policy based on an intent, orchestrate the policy, and send an operation command to the output functional modules. The decision-making functional modules include a situation awareness module, a policy management module, and a model-driven engineering module. Alternatively, the decision-making functional modules include a situation awareness module, a policy management module, a model-driven engineering module, and an intent translation module.

The situation awareness module is mainly responsible for sensing an impact of a recommendation or a command delivered by the ENI system on the assisted system. For example, the situation awareness module is used to sense an achievement situation of an intent-driven object.

The model-driven engineering module mainly assists in converting intent knowledge and context information into a format that can be recognized by the policy management module through a model-driven method.

The policy management module is mainly responsible for generating a policy to ensure achievement of the intent based on the intent knowledge and the context information, and delivers the policy to the assisted system.

The intent translation module is mainly responsible for parsing lexical syntax of an intent expression and obtains intent related knowledge from the knowledge management module based on a content of an intent expression.

It may be understood that, in a current ENI architecture, there are two optional solutions for implementing an intent translation function: (1) performing function enhancement based on the policy management module; and (2) serving as an independent functional module of the architecture.

The intent implementation process includes intent translation, execution, and maintenance. For example, in the intent implementation process, the intent translation module is responsible for intent translation, and sends a translation result to the policy management module. The policy management module implements intent execution and maintenance. In a process of the intent execution and maintenance, the policy management module adjusts an executable command of the intent based on an intent achievement situation.

In addition, an expression of the intent is defined to better invoke the intent. The expression of the intent is as follows:
    <intentExpression>:
        =<IntentDrivenAction><IntentDrivenObject>
    <IntentDrivenAction>:
        =<IntentDrivenActionName><IntentDrivenAction-Properties>
    <IntentDrivenObject>:
        =<IntentDrivenObjectName><IntentDrivenObject-Properties>

It can be learned from the foregoing expression that a complete intent includes two parts, including an intent-driven action and an intent-driven object.

An intent system periodically determines whether the intent is achieved from a time point at which the intent is implemented. If the intent cannot be achieved, the intent system adjusts an executable command corresponding to the intent. A check period of intent-driven object achievement depends on a report capability of the assisted system and is determined by the intent system based on an intent service. A minimum check interval is one minute. When a report period of the assisted system is small, the intent system periodically checks the intent achievement situation before the intent is achieved. The check period of the intent-driven object achievement is the same as the report period of the assisted system.

Reference duration in this embodiment is a minimum time interval at which an executable command for adjusting the intent is to be executed, that is, minimum duration required from time when the executable command starts to be executed to time when the executable command is adjusted next time. In addition, the reference duration may also be referred to as expected time (expected time) or another name. This is not limited in the disclosed embodiments. In addition, it should be noted that a network status collection period (that is, the report period) is less than the reference duration.

Figure 2:
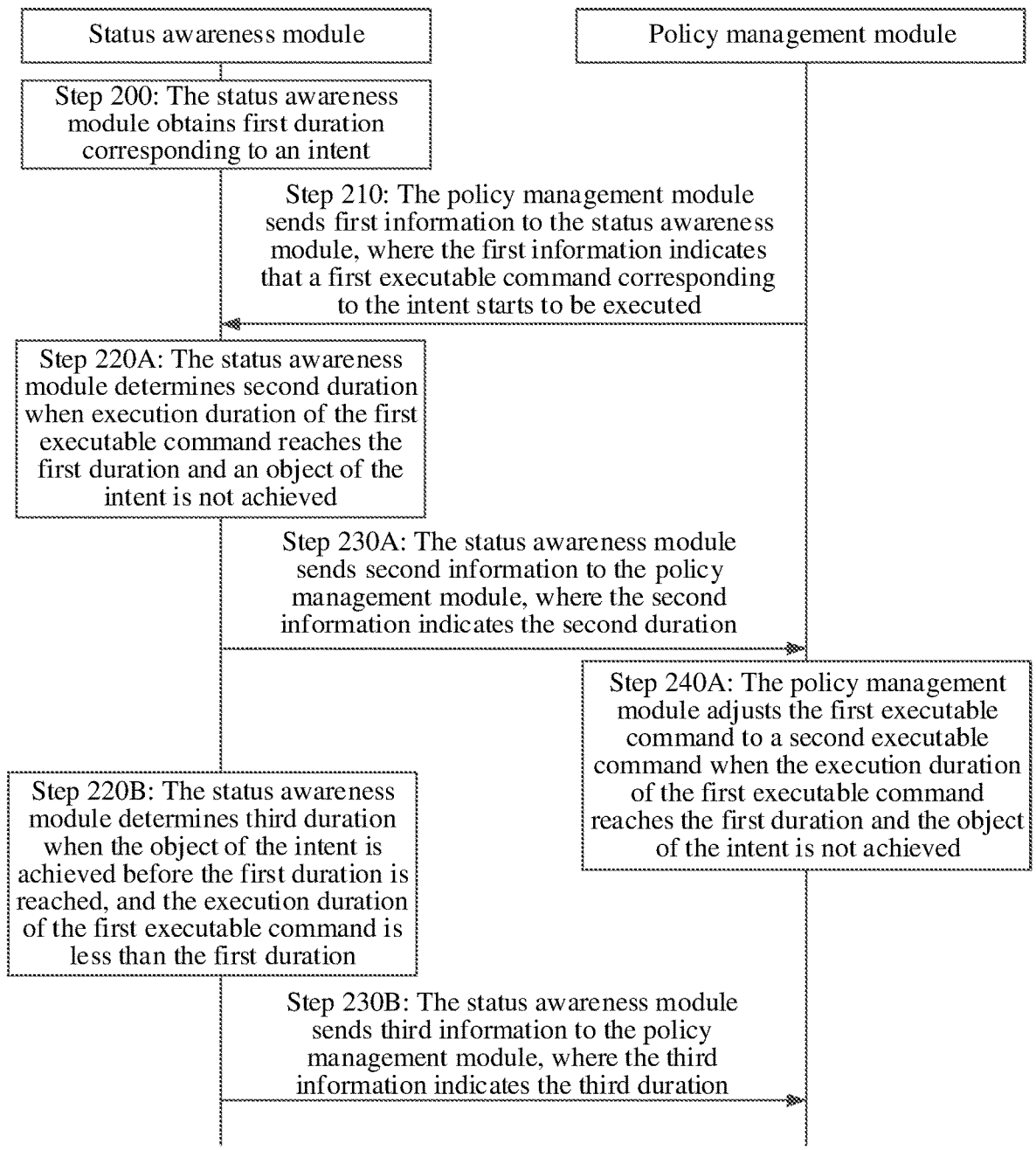
FIG. 2 is an overview flowchart of an intent maintenance method according to an embodiment.

An embodiment provides an intent maintenance method, to reduce a ping-pong handover of intent executable commands before an intent system achieves an intent-driven object, improve efficiency of the intent system to achieve an intent-driven object, and reduce resource consumption. As shown in FIG. 2, the method includes the following steps.

Step 200: A status awareness module obtains first duration corresponding to an intent.

The following describes a possible manner in which the status awareness module obtains the first duration. It may be understood that the following manner is merely an example, and is not intended as a limitation on this embodiment.

Manner 1: The first duration may be carried in a message used to create the intent, implement the intent, or modify the intent. For example, an intent creator may send an intention creation message to the intent system, where the message includes the first duration. Further, the first duration may be forwarded to the status awareness module by another module in the intent system. In this case, the first duration is initial reference duration.

Manner 2: The first duration may alternatively be configured in an intent knowledge repository. For example, another module in the intent system may obtain the first duration from the intent knowledge repository, and forward the first duration to the status awareness module.

Further, the first duration may refer to average duration of intent adjustment executable commands of a same type. Alternatively, the first duration may be determined based on duration required for achieving an intent-driven object in a process of simulating intent implementation. In this case, the first duration initial reference duration.

For example, when intent implementation is simulated for the first time, the intent system records duration required for achieving the intent-driven object, where the duration is recorded as reference duration=To. When intent execution is simulated for the second time, if the intent-driven object is achieved within To, the reference duration is adjusted, that is, the reference duration is reduced. If the intent-driven object is not achieved within To, the reference duration is adjusted, that is, the reference duration is extended. Specifically, if the object of the intent is achieved within To, the reference duration may be adjusted by using a formula T=To+w*t. In this case, t is a negative number, w is a positive number, and t is a difference between duration used to achieve the object of the intent and To. If the object of the intent is not achieved within To, t' is run (for example, t' may be set to To, and a specific value is set based on an empirical value) on a basis of To. If the object of the intent is achieved after t', the reference duration may be adjusted by using a formula T=To+w*t. t is duration by which To is exceeded. If the object of the intent is not achieved within t', an executable command of the intent is adjusted. In addition, the reference duration is adjusted by using the formula T=To+w*t. In this case, t=t'.

Based on the foregoing idea, in some embodiments, after a change trend of the reference duration is stable, one piece of reference duration may be determined as the first duration. For example, it is assumed that a preset floating range is 40 s. After several times of simulating an intent implementation process, a change range of the reference duration is between 4 minutes 45 seconds and 5 minutes 15 seconds. In this case, a floating range of the reference duration is 30 s, and falls within the preset floating range. The first duration may be set to 5 minutes.

In some embodiments, when a quantity of times of simulating the intention implementation process reaches a preset time, reference duration obtained the last time is used as the first duration. For example, if the preset time is assumed as five, and when an intent implementation process is simulated for five times, reference duration determined after the intent implementation process is simulated for the fifth time is used as the first duration.

Step 210: A policy management module sends first information to the status awareness module, where the first information indicates that a first executable command corresponding to the intent starts to be executed.

After receiving the first information, the status awareness module monitors execution duration of the first executable command. If the execution duration of the first executable command reaches the first duration and the object of the intent is not achieved, step 220A is performed. If the object of the intent is achieved before the first duration reaches, step 220B is performed. For example, after receiving the first information, the status awareness module starts to perform timing for the execution duration of the first executable command.

Step 220A: The status awareness module determines second duration when the execution duration of the first executable command reaches the first duration and the object of the intent is not achieved, where the second duration is greater than the first duration.

In an example, the status awareness module may determine the second duration.

In an example, the status awareness module may send fourth information to a knowledge management module, where the fourth information indicates that the execution duration of the first executable command reaches the first duration and the object of the intent is not achieved. After receiving the fourth information, the knowledge management module determines the second duration and sends fifth information to the status awareness module, where the fifth information includes the second duration.

In an example, the status awareness module does not need to send the fourth information to the knowledge management module. However, when the object of the intent is achieved before the first duration is reached, the status awareness module sends third information to the policy management module, where the third information indicates the execution duration of the first executable command, that is, duration required for achieving an actual intent-driven object. When determining that the third information is not received, the knowledge management module determines the second duration and sends fifth information to a status awareness module, where the fifth information includes the second duration.

In addition, the knowledge management module may further update intents of a same type based on the second duration and adjust average duration of executable commands.

It may be understood that the knowledge management module is merely used as an example for description. Alternatively, another module in the intent system may determine the second duration and notify the status awareness module of the second duration. This is not limited in this embodiment.

Further, the status awareness module or the knowledge management module may determine the second duration by using the following formula:

$$\text{Time\_update} = \text{Time\_initial} + \Delta,$$

where $\Delta$ may be a preset value, and $\Delta$ is greater than 0.

Time_update represents the second duration, and Time_initial represents the first duration, for example, $\Delta = 60$ s.

It should be noted that the status awareness module or the knowledge management module may determine the second duration by using another formula. This is not limited in this embodiment.

Step 230A: The status awareness module sends second information to the policy management module, where the second information indicates the second duration.

Step 240A: The policy management module adjusts the first executable command to a second executable command when the execution duration of the first executable command reaches the first duration and the object of the intent is not achieved.

It may be understood that an execution sequence of step 230A and step 240A is not limited in this embodiment.

The policy management module needs to first obtain the first duration corresponding to the intent. For a specific manner in which the policy management module obtains the first duration, refer to step 200. Details are not repeatedly described.

The policy management module determines, based on whether the object of the intent is achieved within the first duration, whether the first executable command needs to be adjusted. If the execution duration of the first executable command reaches the first duration and the object of the intent is not achieved, that is, the object of the intent is not achieved within the first duration, the policy management module needs to adjust the executable command, that is, adjust the first executable command of the intent to the second executable command corresponding to the intent. It should be noted that one intent may correspond to a plurality of executable commands. Herein, the plurality of executable commands include the first executable command and the second executable command. If the object of the intent is achieved before the first duration is reached, the policy management module does not need to adjust the executable command.

In addition, the policy management module sends, to the status awareness module, a message used to indicate that the second executable command starts to be executed. With reference to step 230A, the policy management module determines, based on whether the object of the intent is achieved within the second duration, whether the second executable command needs to be adjusted, and enters a new cyclic process.

It may be understood that the following describes an example in which an executable command is handed over. This embodiment of this application is further applicable to rule handover or sub-intent handover. For example, when execution duration of a first rule reaches the first duration and the object of the intent is not achieved, the policy management module adjusts the first rule to a second rule. Alternatively, when execution duration of a first sub-intent reaches the first duration and an object of the first sub-intent is not achieved, the policy management module adjusts the first sub-intent to a second sub-intent.

Step 220B: The status awareness module determines third duration when the object of the intent is achieved before the first duration is reached, and the execution duration of the first executable command is less than the first duration, where the third duration is less than the first duration.

In an example, the status awareness module may determine the third duration.

In another example, the status awareness module may send sixth information to the knowledge management module, where the sixth information indicates the execution duration of the first executable command. The status awareness module receives seventh information from the knowledge management module, where the seventh information indicates the third duration. In addition, the knowledge management module may further update intents of a same type based on the third duration and adjust average duration of the executable commands.

It may be understood that the knowledge management module is merely used as an example for description. Alternatively, another module in the intent system may determine the third duration and notify the status awareness module of the third duration. This is not limited in this embodiment.

For example, the third duration is the execution duration of the first executable command.

For example, the status awareness module or the knowledge management module may determine the third duration by using the following formula:

Time_update=Time_initial+w*t, where Time_initial is the second duration, w is a weight value, for example, w=1, and t is a difference between the execution duration of the first executable command and the first duration.

It should be noted that the status awareness module or the knowledge management module may determine the third duration by using another formula. This is not limited in this embodiment.

Step 230B: The status awareness module sends the third information to the policy management module, where the third information indicates the third duration.

Further, the policy management module determines, based on whether the object of the intent is achieved within the third duration, whether the first executable command needs to be adjusted.

It should be noted that step 220B and step 230B are optional steps. If the object of the intent is achieved before the first duration is reached, the status awareness module may not need to determine the third duration, and the policy management module continues to determine, based on the first duration, whether to adjust the first executable command.

According to the foregoing method, the ping-pong handover of the intent system on the executable command of the intent is reduced before the intent-driven object is achieved, thereby improving the efficiency of the intent system in achieving the intent-driven object and reducing the resource consumption.

The following describes this embodiment of this application in detail with reference to examples.

Figure 3A:
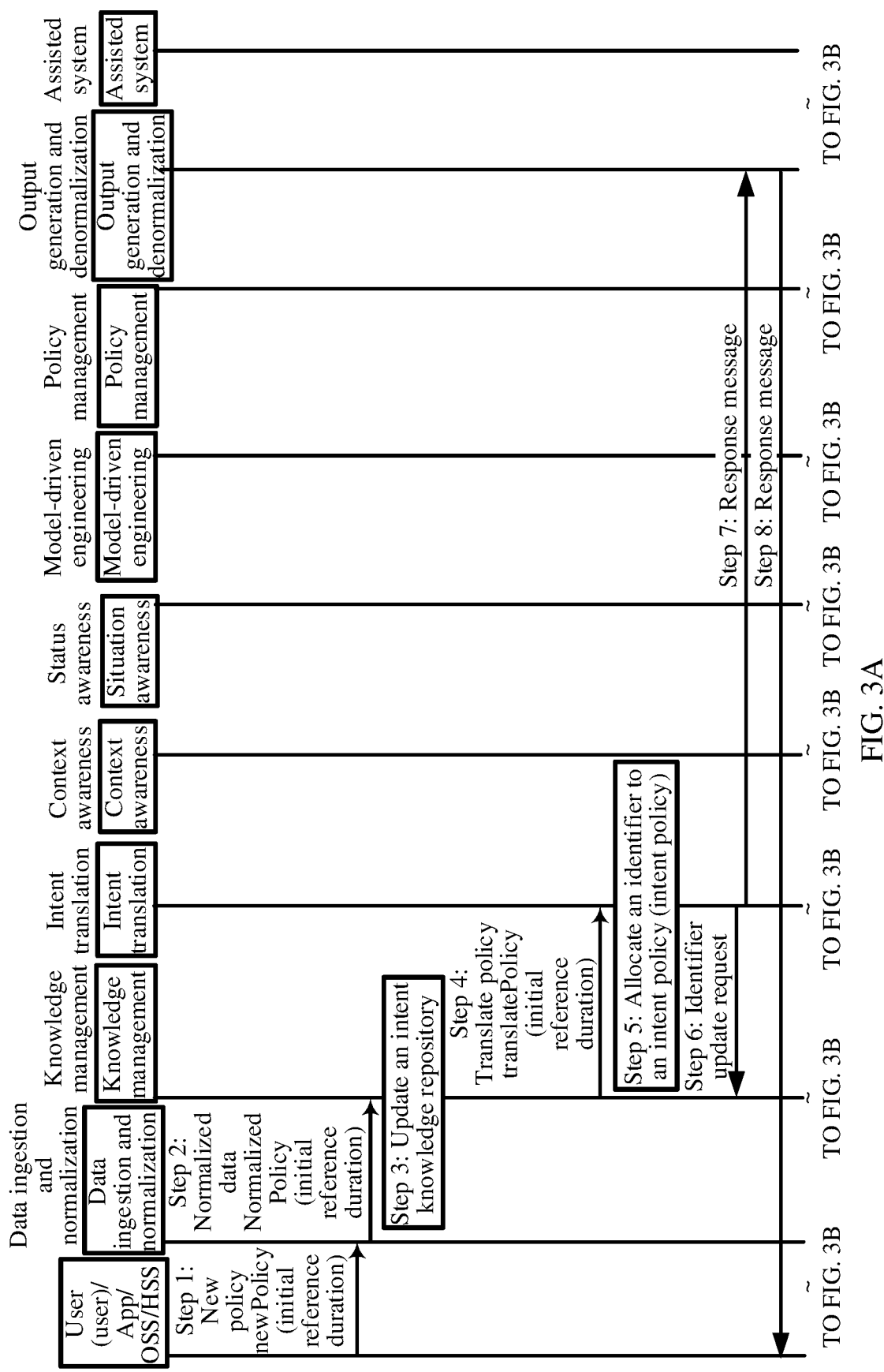
FIG. 3A and FIG. 3B are a first schematic flowchart of intent translation and execution according to an embodiment.
Figure 3B:
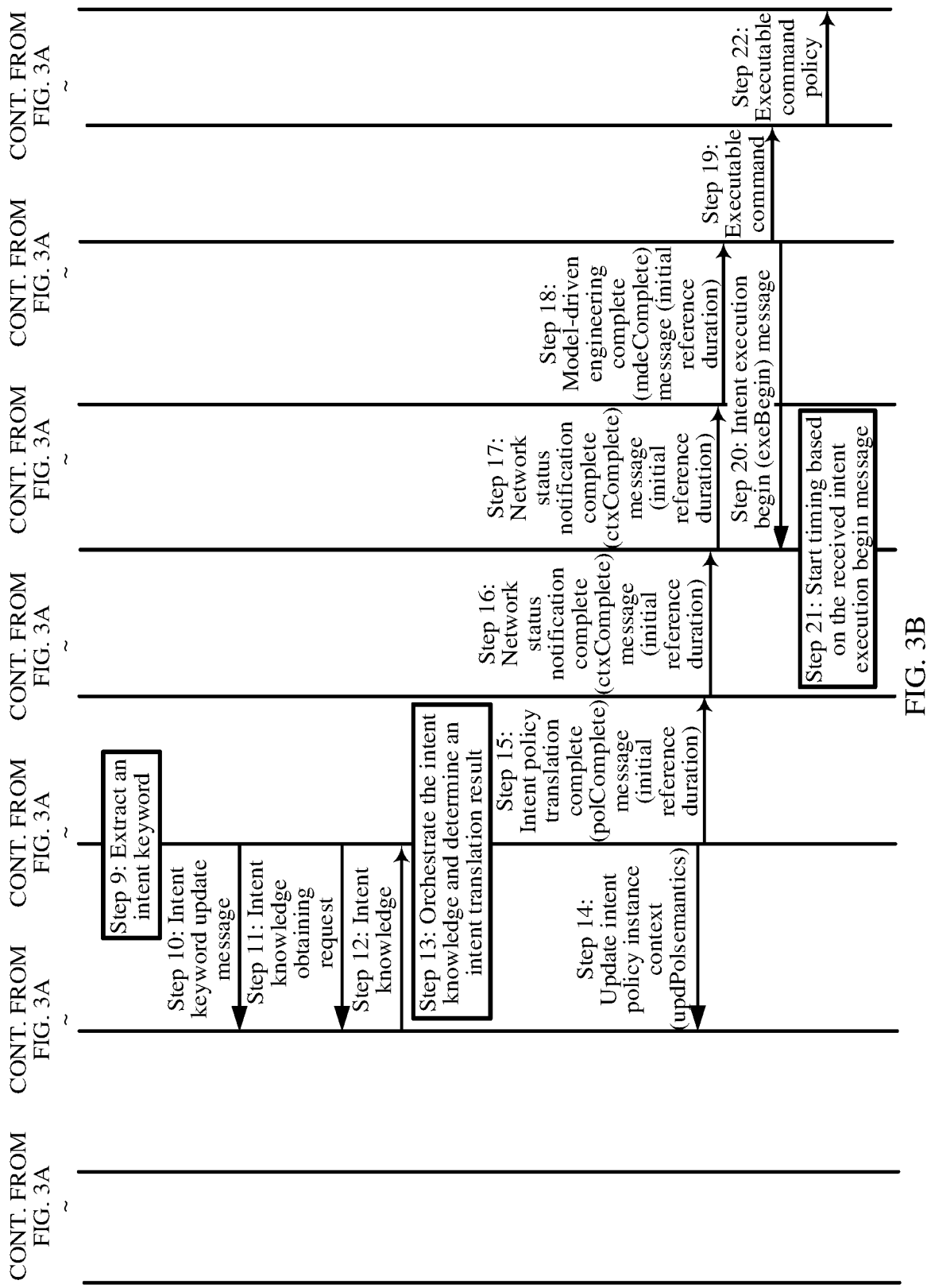

Embodiment 1: FIG. 3A and FIG. 3B are a first schematic flowchart of intent translation and execution. Initial reference duration is delivered by an intent creator.

Step 1: The intent creator sends a new policy message to a data ingestion module and a normalization module, where the new policy message includes the initial reference duration. The initial reference duration may be the first duration in the embodiment shown in FIG. 2. The initial reference duration may also be an initial value of the reference duration.

For example, the intent creator may be a user, an application, an operations support system (OSS), or a business support system (BSS).

Step 2: The data ingestion module and the normalization module normalize the new policy message and related data, and sends the normalized data to a knowledge management module. The normalized data also includes the initial reference duration.

Step 3: The knowledge management module updates an intent knowledge repository based on the normalized data.

Step 4: The knowledge management module sends a translate policy request message to an intent translation module. The translate request message includes the initial reference duration.

Step 5: The intent translation module allocates an identifier to an intent policy.

Step 6: The intent translation module sends an identifier update request to the knowledge management module, where the identifier update request is used to update an intent identifier in the intent knowledge repository.

Step 7: The intent translation module sends a response message to an output generation and denormalization module, where the response message is used to notify that the intent has started to be processed.

Step 8: The output generation and denormalization module sends the response message to the intent creator, where the response message is used to notify that the intent has started to be processed.

In addition, the intent translation module also needs to perform an intent grammar lexical check. If the grammar lexical check is incorrect, the intent translation module sends error feedback information to the intent creator. The intent translation module sends intent error information to the knowledge management module. If the intent grammar lexical check is correct, step 9 is to be performed.

Step 9: The intent translation module extracts an intent keyword.

Step 10: The intent translation module sends an intent keyword update message to the knowledge management module.

Step 11: The intent translation module sends an intent knowledge obtaining request to the knowledge management module.

Step 12: The knowledge management module sends intent knowledge to the intent translation module.

Step 13: The intent translation module orchestrates the intent knowledge and determines an intent translation result.

For example, the intent knowledge may include intent-driven object information, a name of a network status parameter, and an identifier of a network element related to the intent policy.

Step 14: The intent translation module sends an update intent policy instance context (updPolsemantics) message to the knowledge management module.

Step 15: The intent translation module sends an intent policy translation complete (polComplete) message to a context awareness module. The (polComplete) message includes the initial reference duration and the intent translation result.

Step 16: The context awareness module determines a network status, and sends a network status notification complete (ctxComplete) message to the status awareness module. The ctxComplete message includes the initial reference duration and the intent translation result.

Step 17: The status awareness module determines whether an object of the intent is achieved, and sends the network status notification complete message to a model-driven engineering module. The network ctxComplete message includes the initial reference duration and the intent translation result.

Corresponding to the foregoing step 200, the status awareness module obtains the initial reference duration, to prepare for step 20.

Step 18: The model-driven engineering module converts, based on the network status notification complete message, the intent translation result into a form that can be understood by an intent acting entity (that is, an assisted system), updates the result to the knowledge management module, and sends a model-driven engineering complete (mdeComplete) message to the policy management module. The mdeComplete message includes the initial reference duration and the intent translation result.

Step 19: The policy management module converts the intent translation result and makes decisions on the intent translation result, and sends an obtained executable command to the output generation and denormalization module.

The executable command herein may correspond to the first executable command in the implementation shown in FIG. 2.

Step 20: The policy management module sends an intent execution begin message to the status awareness module, where the intent execution begin message indicates that an executable command of the intent starts to be executed.

Step 21: The status awareness module starts timing based on a received intent execution begin message.

If the object of the intent is achieved within the reference duration, the status awareness module records execution duration of the executable command. If the object of the intent is not achieved within the reference duration, the status awareness module may record that the execution duration of the executable command reaches the reference duration and the object of the intent is not achieved, or do not record the execution duration.

Step 22: The output generation and denormalization module sends the executable command to the intent acting entity (that is, the assisted system).

According to the foregoing embodiment, the intent delivered for the first time can carry the reference duration. This can reduce a probability that the executable command of the intent is adjusted before the object of the intent is achieved, and reduce resource consumption.

Figure 4A:
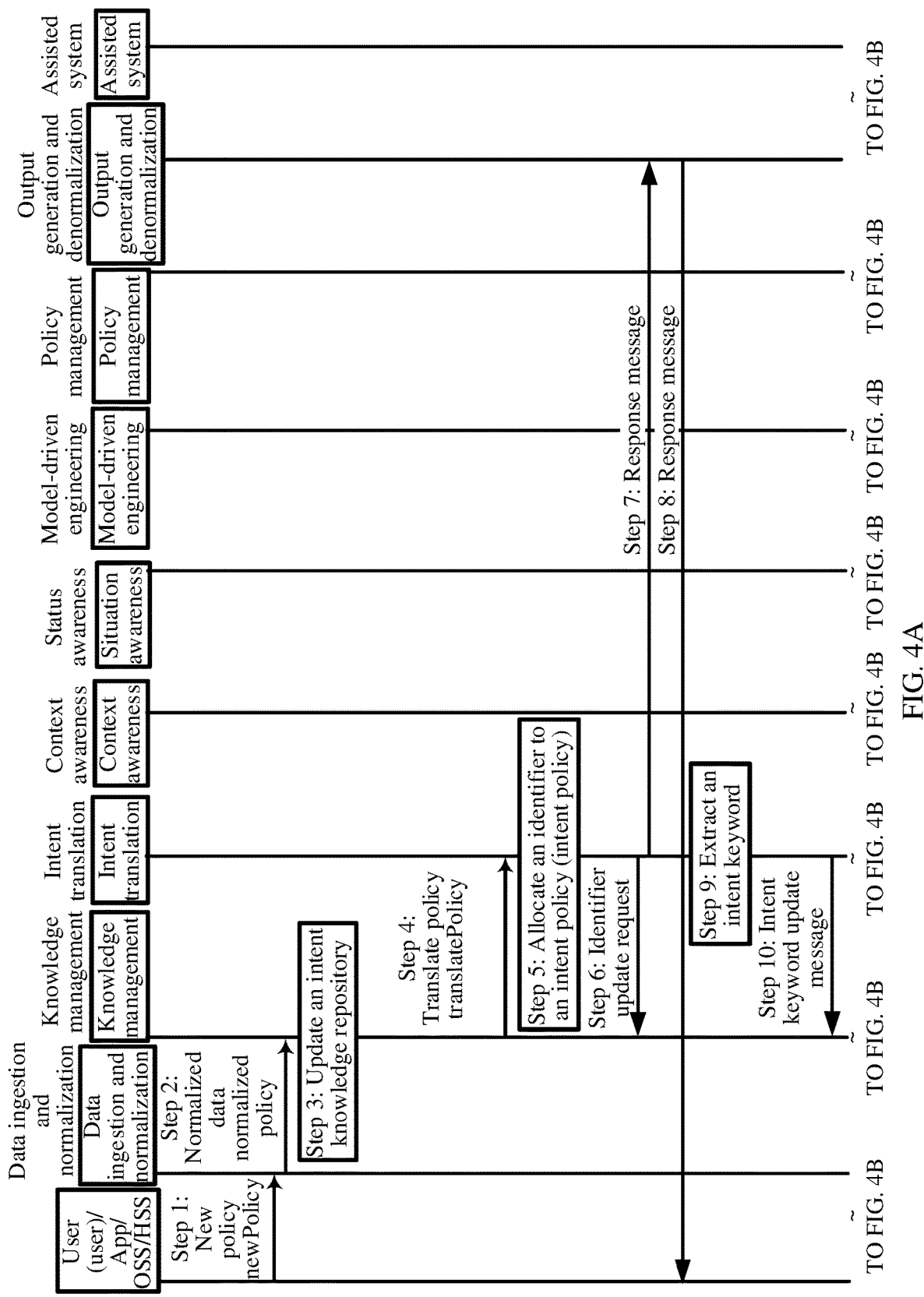
FIG. 4A and FIG. 4B are a second schematic flowchart of intent translation and execution according to an embodiment.
Figure 4B:
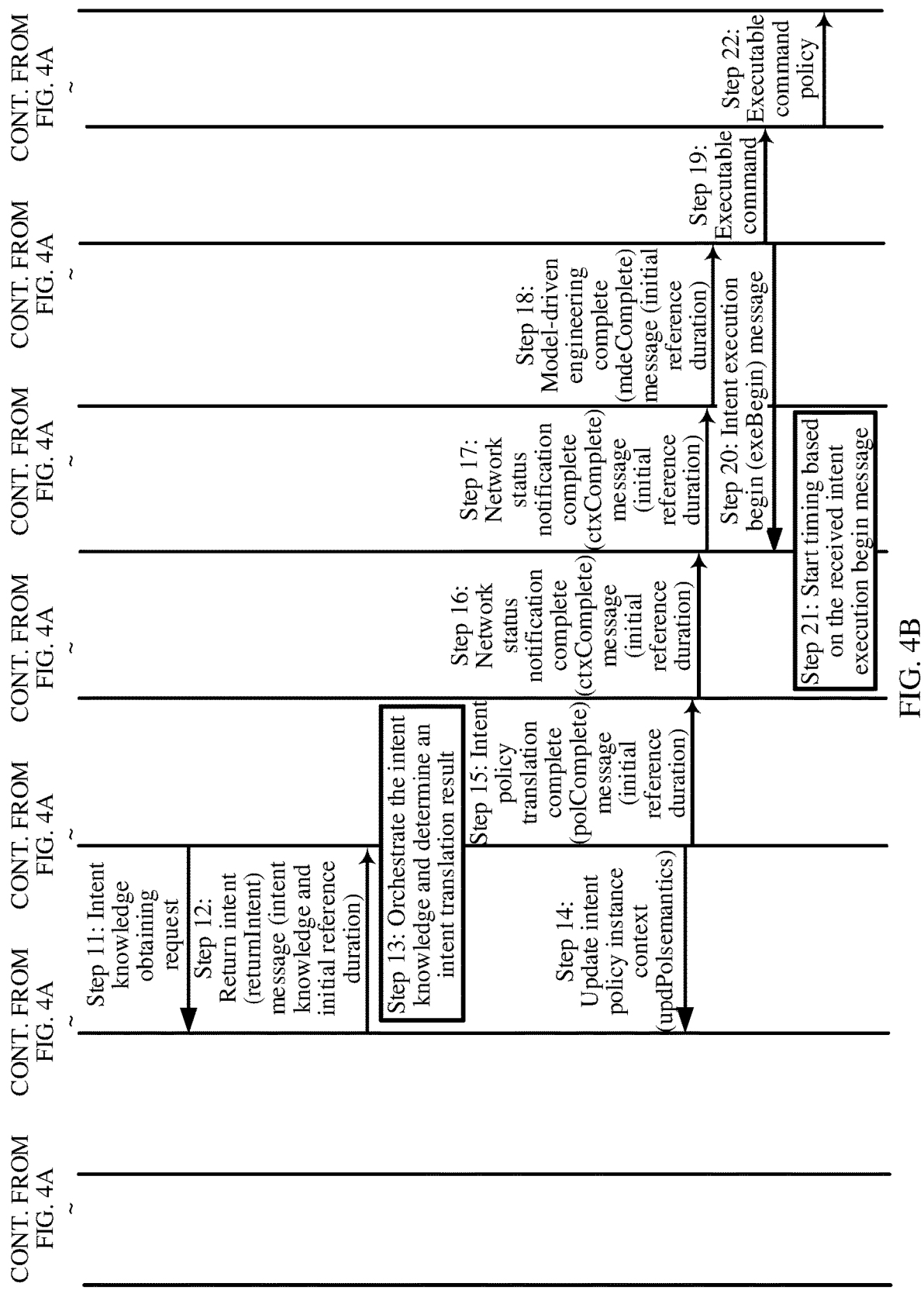

Embodiment 2: FIG. 4A and FIG. 4B are a second schematic flowchart of intent translation and execution. Initial reference duration is stored in an intent knowledge repository.

Step 1: An intent creator sends a new policy message to a data ingestion module and a normalization module, where the new policy message includes the reference duration.

For example, the intent creator may be a user, an application, an OSS or a BSS.

Step 2: The data ingestion module and the normalization module normalize the new policy message and related data, and sends the normalized data to a knowledge management module. The normalized data also includes the reference duration.

Step 3: The knowledge management module updates the intent knowledge repository based on the normalized data.

Step 4: The knowledge management module sends a translate policy request message to an intent translation module. The translate request message includes the reference duration.

Step 5: The intent translation module allocates an identifier to an intent policy Step 6: The intent translation module sends an identifier update request to the knowledge management module, where the identifier update request is used to update an intent identifier in the intent knowledge repository.

Step 7: The intent translation module sends a response message to an output generation and denormalization module, where the response message is used to notify that the intent has started to be processed.

Step 8: The output generation and denormalization module sends the response message to the intent creator, where the response message is used to notify that the intent has started to be processed.

In addition, the intent translation module also needs to perform an intent grammar lexical check. If the grammar lexical check is incorrect, the intent translation module sends error feedback information to the intent creator. The intent translation module sends intent error information to the knowledge management module. If the intent grammar lexical check is correct, step 9 is to be performed.

Step 9: The intent translation module extracts an intent keyword.

Step 10: The intent translation module sends an intent keyword update message to the knowledge management module.

Step 11: The intent translation module sends an intent knowledge obtaining request to the knowledge management module.

Step 12: The knowledge management module sends a return intent message to the intent translation module, where the message carries the initial reference duration and the intent knowledge.

The initial reference duration is stored in the intent knowledge repository. In this case, the initial reference duration may be reference duration corresponding to a type of intents, that is, reference duration of a type of intents.

Step 13: The intent translation module orchestrates the intent knowledge and determines an intent translation result. For example, the intent knowledge may include intent-driven object information, a name of a network status parameter, and an identifier of a network element related to the intent policy.

Step 14: The intent translation module sends an update intent policy instance context (updPolsemantics) message to the knowledge management module.

Step 15: The intent translation module sends an intent policy translation complete (polComplete) message to a context awareness module. The polComplete message includes the initial reference duration and the intent translation result.

Step 16: The context awareness module determines a network status and sends a network status notification complete (ctxComplete) message to the status awareness module that includes the initial reference duration and the intent translation result.

Step 17: The status awareness module determines whether an object of the intent is achieved, and sends the network status notification complete message to a model-driven engineering module. The ctxComplete message includes the initial reference duration and the intent translation result.

Step 18: The model-driven engineering module converts, based on the network status notification complete message, the intent translation result into a form that can be understood by an intent acting entity (that is, an assisted system), updates the result to the knowledge management module, and sends a model-driven engineering complete (mdeComplete) message to the policy management module that includes the initial reference duration and the intent translation result.

Step 19: The policy management module converts the intent translation result and makes decisions on the intent translation result, and sends an obtained executable command or rule to the output generation and denormalization module.

Step 20: The policy management module sends an intent execution begin message to the status awareness module, where the intent execution begin message indicates that an executable command of the intent starts to be executed.

Step 21: The status awareness module starts timing based on a received intent execution begin message.

If the object of the intent is achieved within the reference duration, the status awareness module records execution duration of the executable command. If the object of the intent is not achieved within the reference duration, the status awareness module records that the execution duration of the executable command reaches the reference duration and the object of the intent is not achieved.

Step 22: The output generation and denormalization module sends the executable command or rule to the intent acting entity (that is, the assisted system).

According to the foregoing embodiment, the reference duration is stored in the intent knowledge repository. This can reduce a probability that the executable command of the intent is adjusted before the object of the intent is achieved, and reduce resource consumption.

Figure 5A:
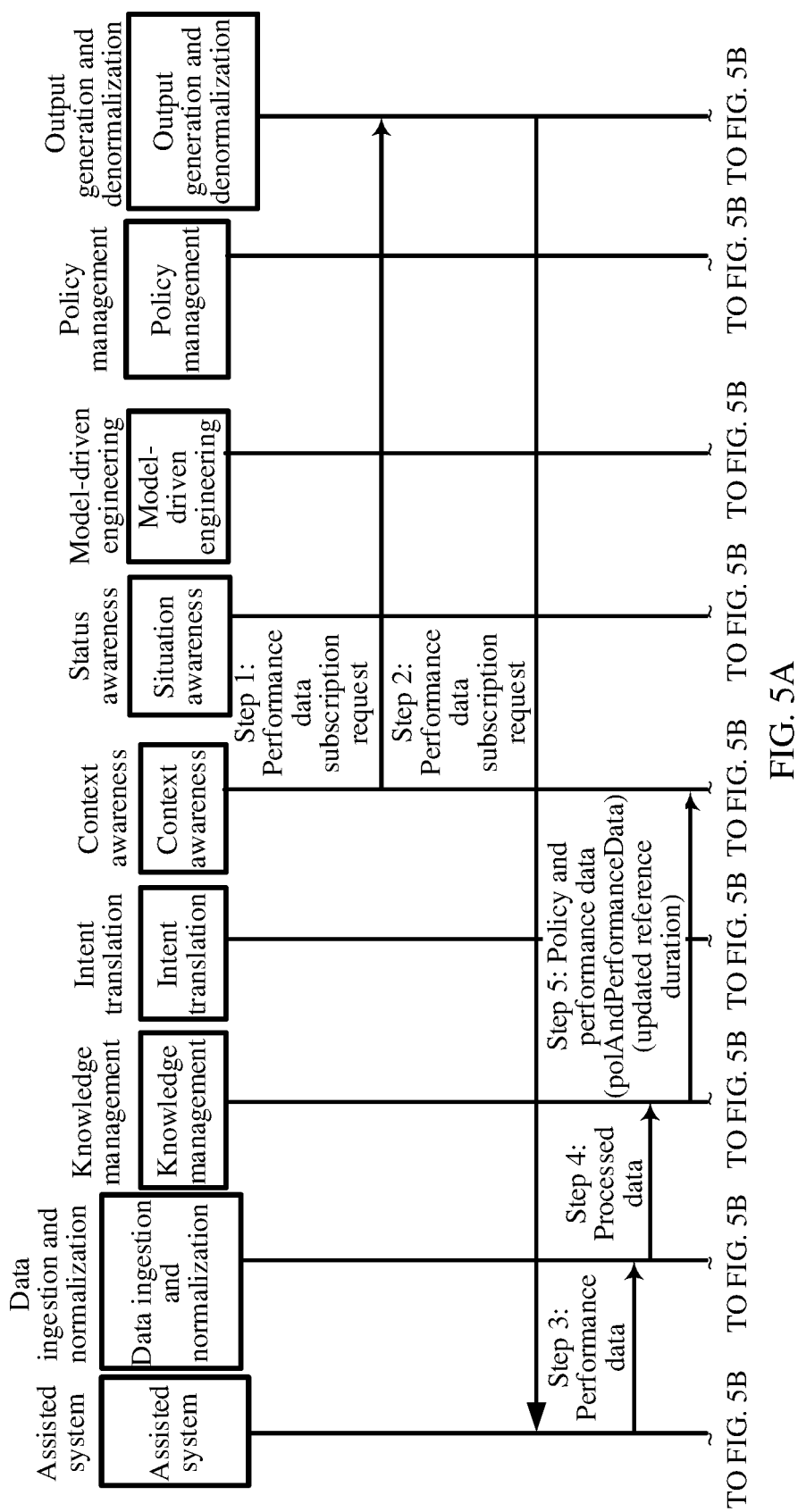
FIG. 5A and FIG. 5B are a first schematic flowchart of intent maintenance according to an embodiment.
Figure 5B:
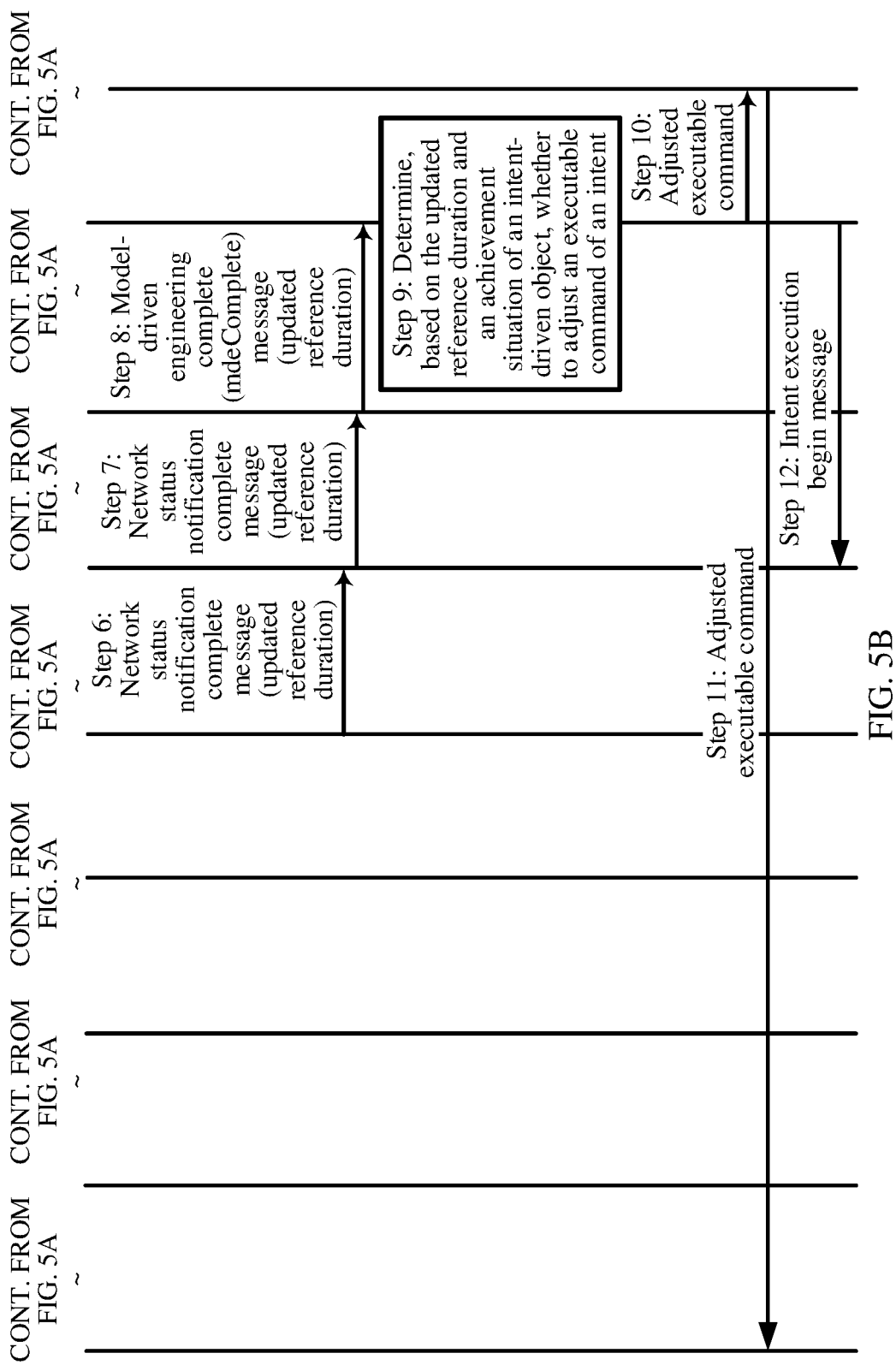

Embodiment 3: FIG. 5A and FIG. 5B are a first schematic flowchart of intent maintenance. In this embodiment, a knowledge management module may determine updated reference duration.

Step 1: A context awareness module sends a performance data subscription request to an output generation and denormalization module.

Step 2: The output generation and denormalization module sends the performance data subscription request to an assisted system.

Step 3: The assisted system sends performance data to a data ingestion module and a normalization module.

Step 4: The data ingestion module and the normalization module normalize the performance data, and sends the normalized data to the knowledge management module.

Step 5: The knowledge management module sends policy and performance data (polAndPerformanceData) to the context awareness module, where the policy and performance data includes the updated reference duration.

When reference duration is not reached and an object of an intent is achieved, a status awareness module may send an update policy situation (updPolSA) message to the knowledge management module, where the message includes measurement duration, and the measurement duration is time that is for achieving an intent-driven object and that is obtained through actual measurement, in other words, execution duration of an executable command used when the object of the intent is achieved within the reference duration. The knowledge management module determines the updated reference duration based on the measurement duration. It may be understood that the measurement duration herein may correspond to the execution duration of the first executable command in the embodiment shown in FIG. 2. In this case, the updated reference duration may correspond to the third duration in the embodiment shown in FIG. 2.

In an example, a formula for calculating the updated reference duration is:

Time_update=Time_initial+w*t, where Time_update is the updated reference duration, and Time_initial is the reference duration recorded in the status awareness module, that is, most recently updated reference duration or initial reference duration, and w is a weight value. For example, w=1, and t is a difference between the measurement duration and Time_initial.

In another example, that the updated reference duration is equal to the measurement duration may be directly defined.

An occasion on which the status awareness module sends the measurement duration to the knowledge management module is not limited in this embodiment of this application. For example, after the status awareness module receives a network status notification complete message from the context awareness module, that is, after step 6, the status awareness module sends the update policy situation message to the knowledge management module, where the message includes the measurement duration. In this case, the measurement duration is execution duration of the executable command that is executed in a previous round.

When the reference duration is reached and the object of the intent is not achieved, the status awareness module may send the updPolSA to the knowledge management module, where the message indicates that the reference duration is reached and the object of the intent is not achieved. The knowledge management module determines the updated reference duration based on the message. For example, Time_update=Time_initial+Δ, where Time_update is the updated reference duration, and Time_initial is the initial reference duration. Δ may be a preset value, and Δ is greater than 0. In this case, the updated reference duration may correspond to the second duration in the embodiment shown in FIG. 2.

In addition, when the reference duration is reached and the object of the intent is not achieved, the status awareness module may not send a message to the knowledge management module. If the knowledge management module does not receive a message sent by the status awareness module, the knowledge management module determines that the reference duration is reached and the object of the intent is not achieved, and the knowledge management module determines the updated reference duration.

It should be noted that, when an intent knowledge repository stores the initial reference duration of the intent, that is, corresponding to the scenario of Embodiment 2, the knowledge management module may further update, based on the updated reference duration, initial reference duration of intentions that belong to a same type in an intent system. For example, $T=(w1*T1+w2*T2+w3*T3+ \ldots +wn*Tn)/n$, where n is a quantity of intentions that belong to a same type (for example, an intent of a bandwidth improvement type) and that are in an active state in the intent system, $T1$, $T2, \ldots$, and $Tn$ are initial reference duration respectively corresponding to the n intentions, and $w1, w2, \ldots$, and $wn$ are weights respectively corresponding to $T1, T2, \ldots$, and $Tn$.

Step 6: The context awareness module sends the network status notification complete message to the status awareness module, where the network status notification complete message includes the updated reference duration.

Step 7: The status awareness module sends the network status notification complete message to a model-driven engineering module, where the network status notification complete message includes the updated reference duration.

Step 8: The model-driven engineering module sends a model-driven engineering complete message to a policy management module, where the model-driven engineering complete message includes the updated reference duration.

Step 9: The policy management module determines, based on the updated reference duration and an achievement situation of the intent-driven object, whether to adjust the executable command of the intent. If the updated reference duration is not reached and the object of the intent is achieved, the executable command of the intent does not need to be adjusted, and the process ends. If the updated reference duration is reached and the object of the intent is not achieved, the executable command of the intent needs to be adjusted, and step 10 is performed.

Step 10: The policy management module sends the adjusted executable command to the output generation and denormalization module.

Step 11: The output generation and denormalization module sends the adjusted executable command to the assisted system.

Step 12: The policy management module sends an intent execution begin message to the status awareness module, and notifies the status awareness module to start a new round of timing of execution duration of an executable command.

According to the foregoing method, the knowledge management module can update the reference duration.

Figure 6A:
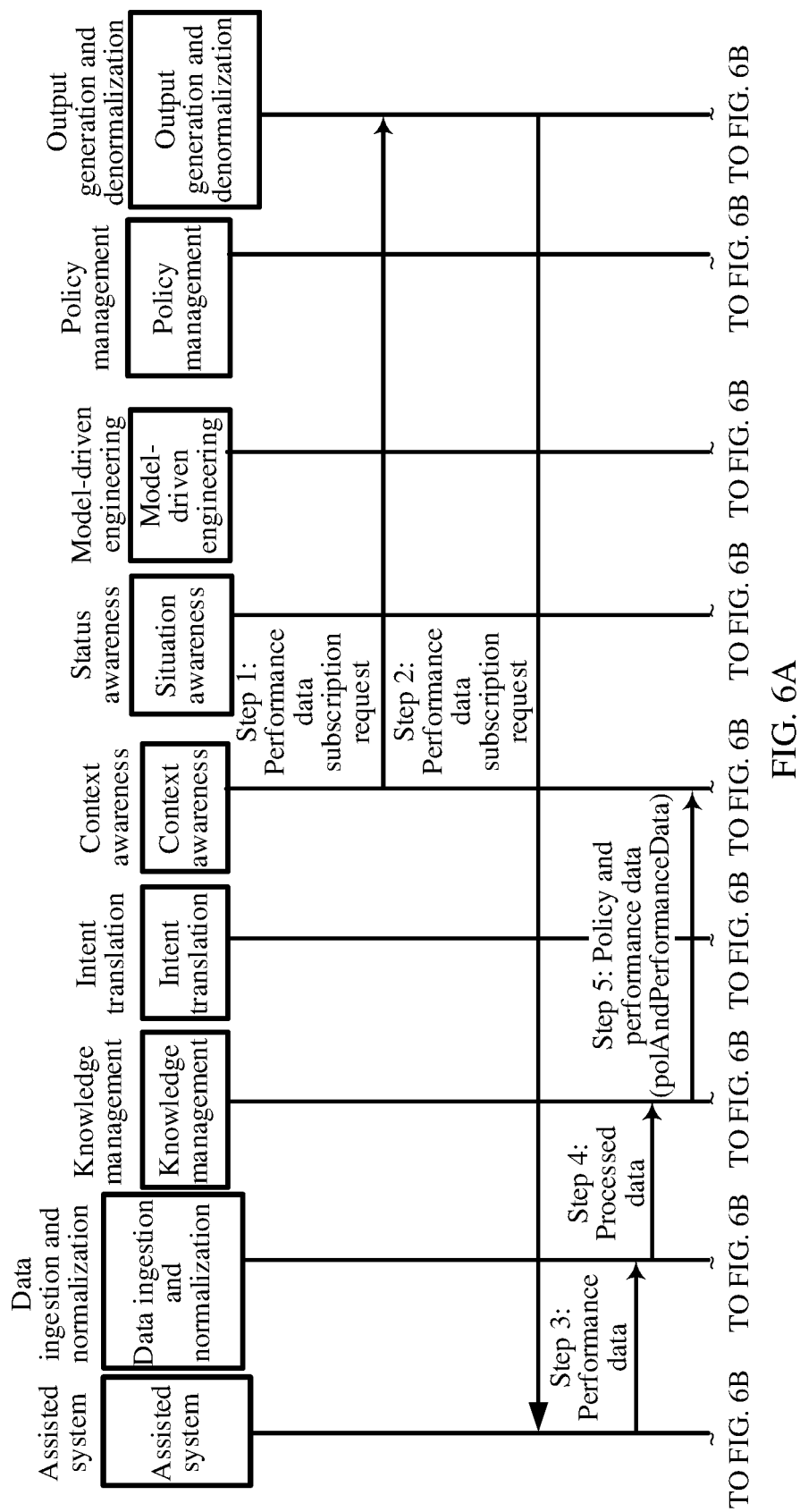
FIG. 6A and FIG. 6B are a second schematic flowchart of intent maintenance according to an embodiment.
Figure 6B:
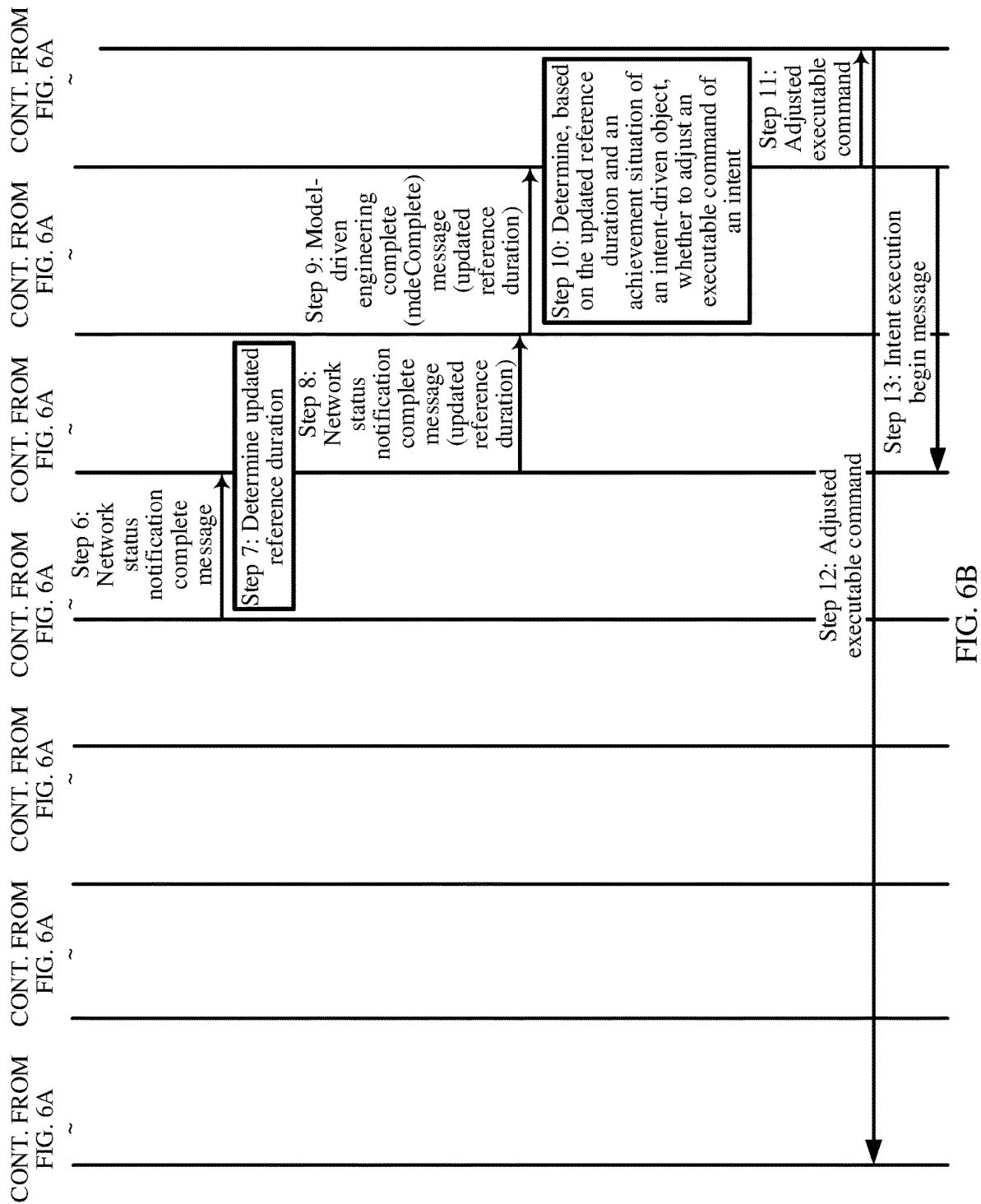

Embodiment 4: FIG. 6A and FIG. 6B are a second schematic flowchart of intent maintenance. In this embodiment, a status awareness module may determine updated reference duration.

Step 1: A context awareness module sends a performance data subscription request to an output generation and denormalization module.

Step 2: The output generation and denormalization module sends the performance data subscription request to an assisted system.

Step 3: The assisted system sends performance data to a data ingestion module and a normalization module.

Step 4: The data ingestion module and the normalization module normalize the performance data and sends the normalized data to a knowledge management module.

Step 5: The knowledge management module stores the performance data, and sends the performance data and intent context information to the context awareness module, where the intent context information is generated in an intent translation and execution phase.

Step 6: The context awareness module determines a network status based on the performance data, adds network status information to the context information, updates the intent context information to the knowledge management module, and sends the updated context information to the status awareness module.

Step 7: The status awareness module determines the updated reference duration.

When reference duration is not reached and an object of an intent is achieved, the status awareness module calculates the updated reference duration based on time that is for achieving an intent-driven object and that is obtained through actual measurement, in other words, execution duration (hereinafter referred to as "measurement duration") of an executable command used when the object of the intent is achieved within the reference duration. In an example, a formula for calculating the updated reference duration is:

Time_update=Time_initial+w*t, where Time_update is the updated reference duration, and Time_initial is the reference duration recorded in the status awareness module, that is, most recently updated reference duration or initial reference duration, and w is a weight value. For example, w=1, and t is a difference between the measurement duration and Time_initial.

In another example, the updated reference duration is equal to the measurement duration may be defined.

When the reference duration is reached and the object of the intent is not achieved, the status awareness module determines the updated reference duration. For example, Time_update=Time_initial+Δ, where Time_update is the updated reference duration, and Time_initial is the reference duration recorded in the status awareness module, that is, most recently updated reference duration or initial reference duration. Δ may be a preset value, and Δ is greater than 0.

Step 8: The status awareness module sends a network status notification complete message to a model-driven engineering module, where the network status notification complete message includes the updated reference duration.

Step 9: The model-driven engineering module sends a model-driven engineering complete message to a policy management module, where the model-driven engineering complete message includes the updated reference duration.

Step 10: The policy management module determines, based on the updated reference duration and an achievement situation of the intent-driven object, whether to adjust the executable command of the intent. If the updated reference duration is not reached and the object of the intent is achieved, the executable command of the intent does not need to be adjusted, and the process ends. If the updated reference duration is reached and the object of the intent is not achieved, the executable command of the intent needs to be adjusted, and step 11 is performed.

Step 11: The policy management module sends the adjusted executable command to the output generation and denormalization module.

Step 12: The output generation and denormalization module sends the adjusted executable command to the assisted system.

Step 13: The policy management module sends an intent execution begin message to the status awareness module, and notifies the status awareness module to start a new round of timing of execution duration of an executable command.

According to the foregoing method, the knowledge management module can update the reference duration.

It may be understood that, to implement the functions in the foregoing embodiments, a network device and a terminal device include corresponding hardware structures and/or software modules for performing the functions. A person skilled in the art should be easily aware that, in combination with the units and the method steps in the examples described in embodiments disclosed in this application, this application can be implemented through hardware or a combination of hardware and computer software. Whether a function is performed by hardware or hardware driven by computer software depends on particular application scenarios and design constraint conditions of the technical solutions.

Figure 7:
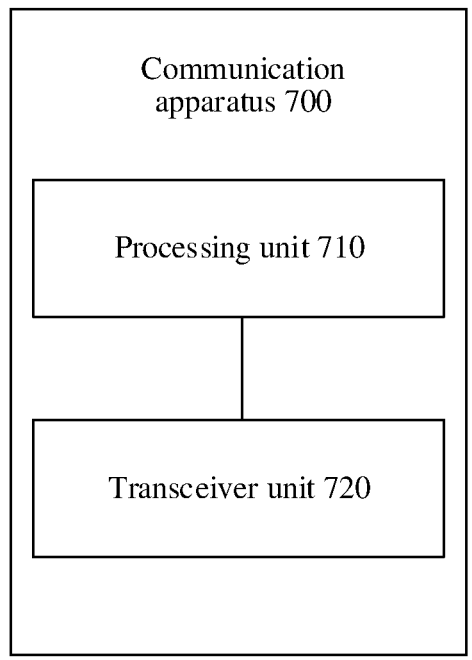
FIG. 7 is a first schematic diagram of a structure of a communication apparatus according to an embodiment.
Figure 8:
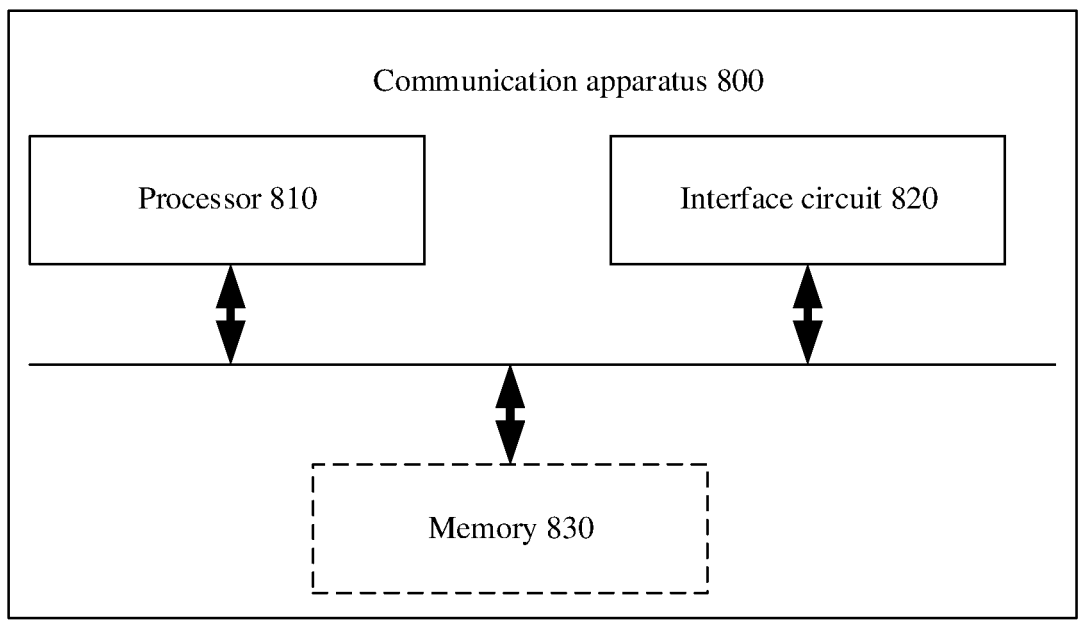
FIG. 8 is a second schematic diagram of a structure of a communication apparatus according to an embodiment.

FIG. 7 and FIG. 8 each are a schematic diagram of a structure of a possible communication apparatus according to an embodiment of this application. These communication apparatuses may be configured to implement functions of the status awareness module, the policy management module, or the knowledge management module in the foregoing method embodiments. Therefore, beneficial effects of the foregoing method embodiments can also be achieved. In embodiments of this application, the communication apparatus may be the status awareness module, the policy management module, or the knowledge management module shown in FIG. 1. Alternatively, the communication apparatus may alternatively be a chip used in the status awareness module, the policy management module, or the knowledge management module.

As shown in FIG. 7, a communication apparatus 700 includes a processing unit 710 and a transceiver unit 720. When the communication apparatus 700 is configured to implement a function of the status awareness module in the method embodiment shown in FIG. 2, FIG. 3A and FIG. 3B, FIG. 4A and FIG. 4B, FIG. 5A and FIG. 5B, or FIG. 6A and FIG. 6B, the transceiver unit 720 is configured to obtain first duration corresponding to an intent, and receive first information from a policy management module, where the first information indicates that a first executable command corresponding to the intent starts to be executed.

The processing unit 710 is configured to determine second duration when execution duration of the first executable command reaches the first duration and an object of the intent is not achieved, where the second duration is greater than the first duration.

The transceiver unit 720 is configured to send second information to the policy management module, where the second information indicates the second duration.

When the communication apparatus 700 is configured to implement a function of the policy management module in the method embodiment shown in FIG. 2, FIG. 3A and FIG. 3B, FIG. 4A and FIG. 4B, FIG. 5A and FIG. 5B, or FIG. 6A and FIG. 6B, the transceiver unit 720 is configured to obtain first duration corresponding to an intent, and send first information to a status awareness module, where the first information indicates that a first executable command corresponding to the intent starts to be executed.

The processing unit 710 is configured to adjust the first executable command to a second executable command corresponding to the intent when execution duration of the first executable command reaches the first duration and an object of the intent is not achieved.

The transceiver unit 720 is configured to receive second information from the status awareness module, where the second information indicates second duration, and the second duration is greater than the first duration.

When the communication apparatus 700 is configured to implement a function of the knowledge management module in the method embodiment shown in FIG. 2, FIG. 3A and FIG. 3B, FIG. 4A and FIG. 4B, FIG. 5A and FIG. 5B, or FIG. 6A and FIG. 6B, the transceiver unit 720 is configured to receive fourth information from a status awareness module, where the fourth information indicates that execution duration of a first executable command of an intent reaches first duration and an object of the intent is not achieved.

The processing unit 710 is configured to determine second duration, where the second duration is greater than the first duration.

The transceiver unit 720 is configured to send fifth information to the status awareness module, where the fifth information indicates the second duration.

When the communication apparatus 700 is configured to implement a function of the knowledge management module in the method embodiment shown in FIG. 2, FIG. 3A and FIG. 3B, FIG. 4A and FIG. 4B, FIG. 5A and FIG. 5B, or FIG. 6A and FIG. 6B, the transceiver unit 720 is configured to receive sixth information from a status awareness module, where the sixth information indicates execution duration of a first executable command when an object of an intent is achieved.

The processing unit 710 is configured to determine third duration based on the execution duration of the first executable command, where the third duration is less than the first duration.

The transceiver unit 720 is configured to send seventh information to the status awareness module, where the seventh information indicates the third duration.

For more detailed descriptions about the processing unit 710 and the transceiver unit 720, directly refer to related descriptions in the method embodiment shown in FIG. 2, FIG. 3A and FIG. 3B, FIG. 4A and FIG. 4B, FIG. 5A and FIG. 5B, or FIG. 6A and FIG. 6B. Details are not described herein again.

As shown in FIG. 8, a communication apparatus 800 includes a processor 810 and an interface circuit 820. The processor 810 and the interface circuit 820 are coupled to each other. It may be understood that the interface circuit 820 may be a transceiver or an input/output interface. Optionally, the communication apparatus 800 may further include a memory 830 that is configured to: store instructions executed by the processor 810, store input data required by the processor 810 to run the instructions, or store data generated after the processor 810 runs the instructions.

When the communication apparatus 800 is configured to implement the method shown in FIG. 2, FIG. 3A and FIG. 3B, FIG. 4A and FIG. 4B, FIG. 5A and FIG. 5B, or FIG. 6A and FIG. 6B, the processor 810 is configured to implement a function of the processing unit 710, and the interface circuit 820 is configured to implement a function of the transceiver unit 720.

It may be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be disposed in an ASIC. In addition, the ASIC may be located in a network device or a terminal device. Certainly, the processor and the storage medium may alternatively exist in the network device or the terminal device as discrete components.

All or some of the foregoing embodiments may be implemented by using software, hardware, firmware, or any combination thereof. When software is used to implement embodiments, all or a part of embodiments may be implemented in a computer program product. The computer program product includes one or more computer programs or instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. In the text descriptions of this application, the character "/" usually indicates an "or" relationship between the associated objects. In a formula in this application, the character "/" indicates a "division" relationship between the associated objects.

It may be understood that various numbers in embodiments of this disclosure are used merely for differentiation for ease of description, and are not used to limit the scope of the disclosed embodiments. The sequence numbers of the foregoing processes do not mean execution sequences, and the execution sequences of the processes should be determined based on functions and internal logic of the processes.

What is claimed is:

1. A network management An intent maintenance-method, comprising:
   obtaining, by a status awareness module of a communication device including the status awareness module and a policy management module, first duration corresponding to an intent;
   executing, by the communication device in accordance with program instructions, a first executable command corresponding to the intent, the executable command being associated with an execution duration;
   receiving, by the status awareness module from a policy management module, first information indicating commencement of execution of the first executable command corresponding to the intent;
   monitoring, by the status awareness module, progress of the first executable command and:
      when the execution duration associated with the first executable command reaches the first duration and an object of the intent has been determined by the status awareness module to not have been achieved, establishing a second duration, the second duration being greater than the first duration; and
      when the object of the intent has been determined by the status awareness module to have been achieved before the first duration has been reached, the execution duration of the first executable command being less than the first duration, establishing a third duration, the third duration being less than the first duration; and
   sending, by the status awareness module to the policy management module, second information indicating the second duration and third information indicating the third duration.

2. The method according to claim 1, wherein the third duration is determined based on the execution duration of the first executable command.

3. The method according to claim 1, wherein the determining, by the status awareness module, the second duration comprises:

sending, by the status awareness module to a knowledge management module, fourth information indicating that the execution duration of the first executable command reaches the first duration and the object of the intent is not achieved; and receiving, by the status awareness module from the knowledge management module, fifth information indicating the second duration.

4. The method according to claim 1, wherein the determining of the third duration comprises:

sending, by the status awareness module to a knowledge management module, sixth information indicating the execution duration of the first executable command; and receiving, by the status awareness module from the knowledge management module, seventh information indicating the third duration.

5. The method according to claim 1, wherein the first duration is:

configured in an intent knowledge repository; or carried by eighth information providing for creating, implementing or modifying the intent.

6. The method according to claim 1, wherein the first duration is determined based on duration required for achievement of an intent-driven object in a process of simulated intent implementation.

7. A network management method, comprising:

obtaining, by a policy management module of a communication device including the policy management module and a status awareness module, a first duration corresponding to an intent;

executing, by the communication device in accordance with program instructions, a first executable command corresponding to the intent, the executable command being associated with an execution duration;

sending, by the policy management module to a status awareness module, first information indicating commencement of execution of the first executable command corresponding to the intent starts;

adjusting, by the policy management module, the first executable command to a second executable command corresponding to the intent when execution duration of the first executable command reaches the first duration and the processing unit determines that an object of the intent has not been achieved;

receiving, by the policy management module from the status awareness module, second information indicating a second duration, the second duration being greater than the first duration, and receiving, by the policy management module from the status awareness module, third information when the object of the intent has been achieved before the first duration has been reached, the execution duration of the first executable command being less than the first duration, the third information indicating a third duration, the third duration being less than the first duration.

8. The method according to claim 7, wherein the third duration is determined based on the execution duration of the first executable command.

9. The method according to claim 7, wherein the first duration is:

configured in an intent knowledge repository; or carried by eighth information provided for creating or implementing or modifying the intent.

10. The method according to claim 7, wherein the first duration is determined based on duration required for achievement of an intent-driven object in a process of simulated intent implementation.

* * * * *